United States Patent [19]

Daily

[11] Patent Number: 5,101,637
[45] Date of Patent: Apr. 7, 1992

[54] REFRIGERANT RECOVERY DEVICE
[75] Inventor: Bernard E. Daily, Brockport, N.Y.
[73] Assignee: CFC Solutions Corp., Rochester, N.Y.
[21] Appl. No.: 651,480
[22] Filed: Feb. 6, 1991
[51] Int. Cl.$^5$ ............................................. F17C 9/02
[52] U.S. Cl. ................................... 62/50.2; 62/77; 62/292; 62/399
[58] Field of Search .................. 62/77, 292, 50.1, 50.2, 62/399

[56] References Cited

U.S. PATENT DOCUMENTS

| | | | |
|---|---|---|---|
| 3,109,291 | 11/1953 | Turner | 62/399 |
| 3,739,842 | 6/1973 | Whalen | 62/399 |
| 4,010,623 | 3/1977 | Kaschak | 62/50.1 |
| 4,716,738 | 1/1988 | Tatge et al. | 62/50.2 |
| 4,761,961 | 8/1988 | Marx | 62/292 |

Primary Examiner—Ronald C. Capossela
Attorney, Agent, or Firm—Howard J. Greenwald

[57] ABSTRACT

A lightweight, portable, unmotorized apparatus for recovering condensable halocarbons is described. The device is comprised of two containers. The first container, which is substantially cryogenic, is adapted to hold refrigerant; this container is comprised of a valve and a refrigerant line. The refrigerant line from the first container is passed in contact with a second container, and the in such line is allowed to vent to an area of relatively low pressure. As the refrigerant is passed to the area of lower pressure, the second container is cooled. The second container is connected to a vessel, which contains the condensable gas to be recovered.

7 Claims, 3 Drawing Sheets

REFRIGERANT RECOVERY DEVICE

FIELD OF THE INVENTION

An apparatus for removing condensable gas from devices containing them.

BACKGROUND OF THE INVENTION

Halogenated hydrocarbons are widely used due to their inertness, low toxicity, and cleanliness. Thus, the chlorofluorocarbons are used as working fluids in air-conditioning systems used in automobiles, aircraft, and ships, in refrigerant systems used in trucks, water coolers, and commercial chillers, in industrial air conditioners, and the like. See, for example, a report by T. D. McCarson, Jr. et al. entitled "Halocarbon Recovery, Recycling, and Reclamation: Issues, Equipment, and Services" (published by the New Mexico Engineering Research Institute of Albuquerque, N. Mex. as report ESL-TR-90-30 in May of 1990, and available from the National Technical Information Service, 5285 Port Royal Road, Springfield, Va.).

It is widely believed that the halogenated hydrocarbons deplete the ozone layer surrounding the earth and thus allow the transmission of harmful radiation to the surface of the earth. Thus, thus use of halogenated hydrocarbons has been severely restricted by many major industrial countries.

In 1987, approximately 41 countries signed the "MONTREAL PROTOCOL ON SUBSTANCES THAT DEPLETE THE OZONE LAYER;" as of now, at least 62 countries have ratified such protocol Some of the countries which are parties to this protocol include the United States, Canada, Australia, the United Kingdom, Japan, France, and Germany.

In order to encourage the recycling of halogenated hydrocarbon refrigerant, the United States Congress has enacted an excise tax on such ozone-depleting chemicals. However, recycled ozone-depleting chemicals are exempt from this tax. An example of how onerous this tax may be is presented in the December 1989 issue of "CFC Alliance: Special Bulletin" (CFC Alliance, 2011 Eye Street, N. W., Fifth Floor, Washington, D.C. 20006). On page 4 of this bulletin, an example is given of a "floor stocks tax." In this example, reference is made to an "XYZ" Company which ". . . holds 500 pounds of halon 2402 on Jan. 1, 1994. XYZ Company purchased the chemical in 1992. The floor stocks tax will equal $7,825."

Many of the States in the United States have also encouraged the recycling of halogenated hydrocarbon refrigerant by enacting strict laws governing the use of and recovery of halogenated hydrocarbons. The aim of many of these laws was to mandate the removal of halogenated hydrocarbon from refrigerant and air-conditioning systems.

Thus, by way of illustration, on May 10, 1990 the New York State Senate enacted a bill ". . . to amend the environmental conservation law, in relation to the definition of approved motor vehicle refrigerant recycling." This act provides that, (1) ". . . no person repairing or servicing motor vehicle air conditioners shall knowingly vent into the atmosphere the chlorofluorocarbon compounds contained in such air conditioners and shall capture and recycle. . . the chlorofluorocarbon compounds. . . by using approved refrigerant recycling equipment. . . ," (2) ". . . no motor vehicle air conditioners shall be disposed of by any means without first having had the chlorofluorocarbon refrigerants contained within mechanical cooling systems captured for recycling. . . " (3) ". . . no chlorofluorocarbon compounds shall knowingly be vented into the atmosphere or otherwise be improperly disposed of during the repair, servicing, or disposal of refrigeration systems. . . ," and (4) ". . . no containers containing. . . chlorofluorocarbon compounds. . . shall be sold or offered for sale within the state except for sales to persons. . . who have obtained for use in their business approved motor vehicle refrigerant recycling equipment."

Thus, New York State, and many other states, have made it essential for mechanics servicing and/or dismantling refrigeration and/or air conditioning equipment to use suitable refrigerant recycling equipment. Unfortunately, the refrigerant recycling equipment now available is expensive, cumbersome, easily damaged by contaminants, difficult to operate, and unreliable.

One category of halogenated hydrocarbons which are believed to have the greatest adverse impact upon the earth's ozone layer are the halons. These halons are bromine-containing halocarbons that exhibit exceptional effectiveness in fighting fire and destroying ozone.

Although there are at least 25 United States companies which manufacture equipment designed to recover the chlorofluorocarbons, there are only 5 such United States companies which provide equipment which can recover the halons.

Every halogenated hydrocarbon recovery system which is currently available for the recovery of both chlorofluorocarbons and halons contains a compressor or a pump. Thus, for example, one of the most widely sold of such systems is the Robinair "Model 17500," which is described in U.S. Pat. Nos. 4,763,347, 4,805,416, 4,809,520, and 4,878,356. This system, which is manufactured by the SPX Corporation of Montpelier, Ohio, has a configuration which is typical of the refrigerant recovery systems currently on the market. Thus, this Robinair system contains a compressor, a condenser, a liquid pump filtering system, an oil separator, and many other components; see, e.g., the "Robinair Operating Manual" for "Model 17500" (publication 109943 89-59 [3/90], published by the Robinair Division, SPX Corporation, Robinair Way, Montpelier Ohio 43543).

One of the problems presented by the Robinair Model 17500, and the other prior art systems currently available is their complexity. Because they contain many mechanical parts, they are relatively big, heavy, expensive, and difficult to use. Thus, the Robinair Model 17500 weights 160 pounds, costs at least $3,500, and is accompanied by an instruction manual which recommends that the system ". . . SHOULD BE OPERATED BY QUALIFIED PERSONNEL. Operator must be familiar with A/C-R systems, refrigerants and the dangers of pressured components. Use only with refrigerants R-12, R-22, R-500 or R-502" (see page 1 of the aforementioned Robinair Operating Manual.)

The Robinair Model 17500 must be powered by an electrical source providing 115 volts at 60 hertz, and 13.1 amperes. When the Robinair Model 17500 must be used from a location substantially distant from an electrical, an extension cord must be used; the longer this extension cord, the larger the voltage drop across it, and the lower the voltage will be which delivered to the refrigerant recovery device. Thus, by way of illustration, in a relatively hot climate if a 100 foot extension cord is used to connect the Robinair Model 17500 to an electrical outlet providing 115 volts, a sufficient voltage drop often will occur across the extension cord so that the compressor of the model 17500 will not operate.

Even if the voltage drop across the extension cord is not so great as to prevent operation of the model 17500's compressor, a substantial amount of time is required for the serviceman to connect the device to a power supply. Furthermore, the operation of such a device with a long extension cord is often cumbersome and dangerous.

The Robinair model 17500 is also somewhat difficult and expensive to set up. Thus, as is indicated on page 3 of said "Robinair Operating Manual," a vacuum pump must be used to install the refillable refrigerant tank in the device. These vacuum pumps, which often cost in excess of $250, are not readily available to many automotive mechanics.

Inasmuch as the Robinair model 17500 contains a compressor which, during operation, comes into direct contact with the contaminated refrigerant being reclaimed, it often is damaged by such impurities. Furthermore, near the end of the recovery cycle, there usually is a relatively low mass flow through the compressor. Both of these factors tend to limit the effective service life of the unit. Thus, the SPX Corporation only warrants the compressor of the model 17500 for 120 days.

By way of illustration, another refrigerant recovery system is provided by the Van Steenburgh Engineering Laboratories, Inc. of 1900 South Quince Street, Denver, Colo. Although the Van Steenburgh model number BV-300-4 is allegedly quite effective in reclaiming refrigerants, it currently costs $10,800, weights 725 pounds, and must be electrically powered.

It is an object of this invention to provide a device which is capable of recovering both chlorofluorocarbons and halons.

It is another object of this invention to provide a relatively inexpensive apparatus for recovering halogenated hydrocarbons from apparatuses containing them.

It is yet another object of this invention to provide an apparatus for recovering halogenated hydrocarbon which need not be powered by an external source of power.

It is yet another object of this invention to provide an apparatus for recovering halogenated hydrocarbon which is relatively light weight.

It is yet another object of this invention to provide an apparatus for recovering halogenated hydrocarbon which is relatively easy to use.

It is yet another object of this invention to provide an apparatus for recovering halogenated hydrocarbon which contains substantially no moving pars and is relatively durable.

It is yet another object of this invention to provide an apparatus for recovering halogenated hydrocarbon refrigerant in which the contaminated refrigerant being recovered does not come into contact with the apparatus.

SUMMARY OF THE INVENTION

In accordance with this invention, there is provided an apparatus for recovering halogenated hydrocarbons. This apparatus contains means for providing a specified amount of liquid nitrogen, means for evaporating liquid nitrogen, means for transferring energy to the halogenated hydrocarbon from the liquid nitrogen being evaporated, and means for venting the evaporated liquid nitrogen.

BRIEF DESCRIPTION OF THE DRAWINGS

The preferred embodiments of applicant's invention are illustrated by the enclosed drawings, wherein like numbers refer to the like elements, and wherein.

DESCRIPTION OF THE PREFERRED EMBODIMENTS

The device of applicant's invention uses substantially less energy than prior art refrigerant recovery devices. The prior art devices require one to bring a mechanical compressor to the site of the contaminated halogenated hydrocarbon to be recovered, to supply the mechanical compressor with a source of power (typically electricity), to extract the contaminated hydrocarbon with mechanical energy by creating a pressure differential, thereby creating a high-pressure, high-temperature gas, and to remove thermal energy from the gaseous contaminated hydrocarbon By comparison, applicant's device relies upon energy contained in the contaminated halocarbon and does not require the use of a compressor to extract the halocarbon. Furthermore, applicant's system does not create a contaminated halocarbon at high pressure and/or temperature which needs to be cooled.

The apparatus of applicant's invention is unmotorized. As is known to those skilled in the art, a motorized device is one that is equipped with a motor, i.e., a device which imparts of produces mechanical motion. The pumps and/or compressors used in the prior art refrigerant recovery devices are examples of motors.

There is no motor device in applicant's apparatus; mechanical motion is not produced through the conversion of energy into mechanical energy.

Figure 1:
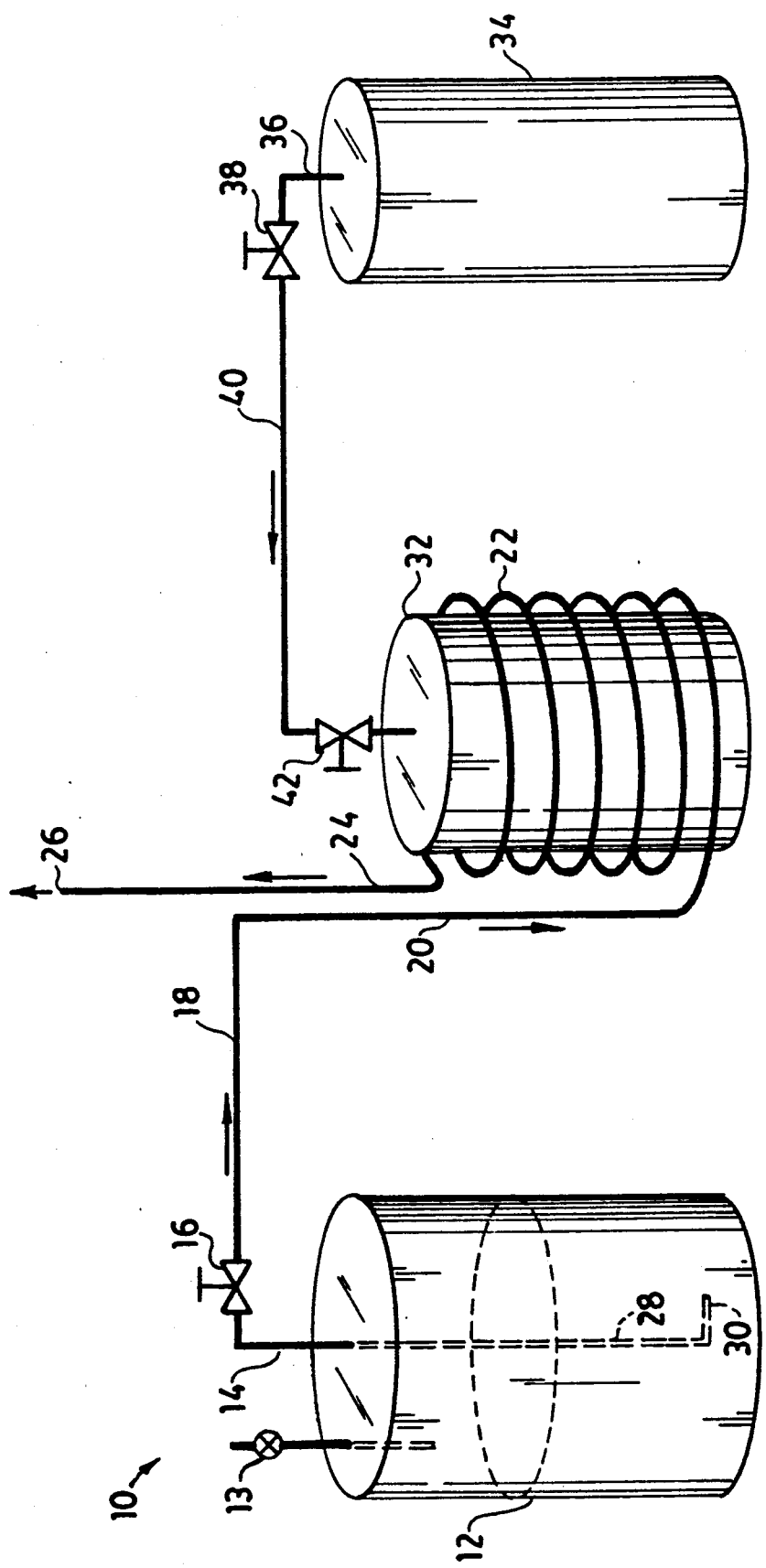
FIG. 1 is a schematic diagram illustrating the principles used in the operation of applicant's invention.

The principles of applicant's invention are illustrated in FIG. 1. Referring to FIG. 1, a source 10 of expendable refrigerant is provided. As used in this specification, the term expandable refrigerant refers to a refrigerant which forms a gas upon the application of energy and when, in gaseous form, can be vented to the atmosphere. The use of this type refrigerant is often referred to as "open cycle refrigeration."

A refrigerant with a boiling point, at a pressure of 14.696 pounds per square inch absolute, of less than −100 degrees Fahrenheit, may be used. These refrigerants are well known to those skilled in the art and are described in the "1989 ASHRAE Handbook Fundamentals," I-P Edition (American Society of Heating, Refrigerating and Air Conditioning Engineers, Inc., 1791 Tullie Circle, N. E., Atlanta, Ga., 1989).

Thus, by way of illustration, one may use refrigerants such as helium, hydrogen, neon, nitrogen, air, argon, oxygen, methane, tetrafluoromethane, ethylene, ethane, nitrous oxide, trifluoromethane, chlorotrifluoromethane, carbon dioxide, and the like.

It is preferred that the refrigerant used be selected from the group consisting of carbon dioxide, and nitrogen.

In the process of applicant's invention, the expendable and expendable refrigerant is provided at a temperature which is less than −100 degrees Fahrenheit. Thus, when carbon dioxide is used, it is provided in the form of dry ice. When nitrogen is used, it is provided in the form of liquid nitrogen.

The container 12 used in applicant's invention is substantially, but not completely cryogenic; it should allow a specified amount of heat to be transferred from the ambient surroundings to the container.

In order to determine whether a container is substantially cryogenic, within the meaning of this invention, liquid nitrogen at a temperature of −320 degrees Fahrenheit is charged to the container, and the container is fitted with a pressure relief valve (see valve 13 in FIG. 1) which will vent gaseous nitrogen to atmosphere whenever the pressure within the container exceeds 5 pounds per square inch gauge. The container containing the liquid nitrogen is then subjected to a temperature of 70 degrees Fahrenheit and a pressure of 14.7 pounds per square inch absolute. After 24 hours, the volume of liquid nitrogen remaining in the container is then determined. The cryogenic container used in applicant's invention will lose from about 0.9 to about 5 percent, by volume, of the liquid nitrogen every 24 hours. The amount of liquid nitrogen remaining in the container may be determined by conventional means such as, e.g., by weighting the container before the liquid nitrogen is charged to it, after it is charged at time zero, and after 24 hours.

Vessels which are substantially cryogenic are well known to those skilled in the art. Thus, by way of illustration, such vessels are often made of special materials (such as stainless steel, aluminum, and the like) which are able to withstand extremely low temperatures without losing their strength. Insulation is often very heavy in these containers. Small containers are often of a thermos bottle construction. Pressures are kept at a relatively low level (usually less than 12.5 p.s.i.g.). Usually no attempt is made to seal the fluid in a pressure-tight environment. Thus, some of the fluid is constantly boiling, thereby maintaining the rest of the fluid at a very low temperature; the vapor from the boiling fluid is allowed to escape.

Cryogenic containers are described in, e.g., Andrew D. Althouse's "Modern Refrigeration and Air Conditioning" (The Goodheart-Willcox Company, Inc., South Holland, Ill., 1982), the disclosure of which is hereby incorporated by reference into this specification.

The liquid nitrogen in container 12 may pass through liquid line 14 and, when liquid valve 16 is open, may also pass through lines 18 and 20, coil 22, and line 24. The difference in pressure between the atmospheric pressure (at point 26) and the 5 p.s.i.g. pressure (in container 12) forces the liquid nitrogen to flow from vessel 12 through dip tube 28 and thence through lines 14, 16, 18, and 20.

At point 26, line 24 is open, allowing the nitrogen to vent to atmosphere. Because of the difference in pressure between point 26 and point 30, the pressure the liquid nitrogen is exposed to as it passes through lines 14, 16, 18, and 20 gradually decreases. This decrease in pressure causes the liquid nitrogen to volatilize and to draw heat from its environment. Thus, as the liquid nitrogen is volatilizing in coil 22, it draws heat away from container 32.

It is preferred that lines 14, 16, 18, and 20 have a diameter such that the liquid flow to coil 22 be from about 1 to about 2 liters per minute. In general, said lines may have any cross-sectional shape such as a square shape, a rectangular shape, a circular shape, an irregular shape, and the like. It is preferred that the line have a substantially circular shape.

The maximum internal cross-sectional dimension of the lines 14, 16, 18, 20, and 24 (which, in the case of a circular shape is the line's internal diameter) should be at least about 0.25 inches and, preferably, is from about 0.25 to about 1.0 inches.

In one preferred embodiment, coil 22 has a similar configuration and/or dimensions and/or composition as does lines 14 and/or 16 and/or 18 and/or 20 and/or 24. It is to be understood that all of said lines and/or coil 22 may be substantially identical; alternatively, one (or all) of them may differ from the others in one or more respects.

The lines 14, 16, 18, 20, and 24 should be constructed of a material able to withstand a temperature of at least low as −90 degrees Fahrenheit without losing their strength. By way of illustration, suitable materials include brass, stainless steel, copper, polyethylene, and the like.

Referring again to FIG. 1, when valve 16 is open, the volatilization of the liquid nitrogen and the venting of the gaseous nitrogen thus formed at point 26 will cool the container 32 enclosed by coil 22.

The container 32 is preferably a refrigerant container. These containers are well known to those skilled in the art and are described, e.g., on page 293 of said "Modern Refrigeration and Air Conditioning" text. It is preferred that container 32 by substantially cylindrical.

In one embodiment, container 32 is a storage cylinder. In another embodiment, container 32 is a returnable service cylinder In yet another embodiment, container 32 is a disposable (throw-away) cylinder.

The container 32 will preferably be a cylinder which consists essentially of steel or aluminum. In one embodiment, container 32 will have a fusible plug safety device threaded into its concave bottom as a protection against overheating or excessive pressures. It is preferred that container 32 contain a valve at its top to provide a connection for charging or discharging service cylinders.

In the process of applicant's invention, the pressure within container 32 will either be greater than atmospheric pressure or less than atmospheric pressure.

In one embodiment, the initial pressure in container 32 is less than atmospheric pressure. In this embodiment, container 32 is evacuated until its pressure is such that non-condensable gases (such as air) are withdrawn from the cylinder; in general, such pressure may be from about 250 to about 1,000 microns of mercury, absolute.

Once the pressure in container 32 has been reduced to less than atmospheric pressure, container 32 is set within evaporator coil 22.

A connection is then made between container 32 and refrigerant-containing device 34, by means of line 36, valve 38, line 40, valve 42. When valves 38 and 42 are opened, refrigerant will flow from container 34 to container 32 because of the pressure differential in said containers; this flow will continue until equilibrium has been reached.

Once equilibrium has been reached, refrigerant may then be allowed to flow from container 12 to point 26 via the means described elsewhere in this specification. This flow will cool container 32 and its contents, thereby causing the refrigerant in container 32 to condense. This condensation will reduce the volume and pressure of the refrigerant in container 32, thereby causing more of the refrigerant from container 34 to flow to container 32.

In another embodiment, the pressure in container 32 is greater than atmospheric pressure. In this embodiment, container 32 initially contains some refrigerant which will usually comprise a mixture of gas and liquid; the amount of gas and liquid in the refrigerant in container 34 will depend upon, e.g., the temperature within container 34 which, in turn, depends at least in part upon the ambient temperature.

In this embodiment, the initial temperature within containers 32 and 34 will be substantially equal, both being at about ambient temperature. However, because of the presence of gas in such containers, each will have a pressure which is greater than atmospheric.

Valves 42 and 38 may be opened when containers 32 and 34 are at ambient temperature. When this occurs, the pressures in containers 32 and 34 will equalize. Thereafter, nitrogen may be caused to flow from point 30 to point 26 via the means described elsewhere in this specification, thereby causing the temperature within container 32 to decrease. This decrease in temperature will cause the gas in container 32 to condense, thereby decreasing both the volume of such gas and the pressure within container 32. Because of the pressure differential between containers 32 and 34 thus produced, refrigerant gas will then flow from container 34 to container 32.

DESCRIPTION OF ONE PREFERRED SPECIFIC EMBODIMENT

Figure 2:
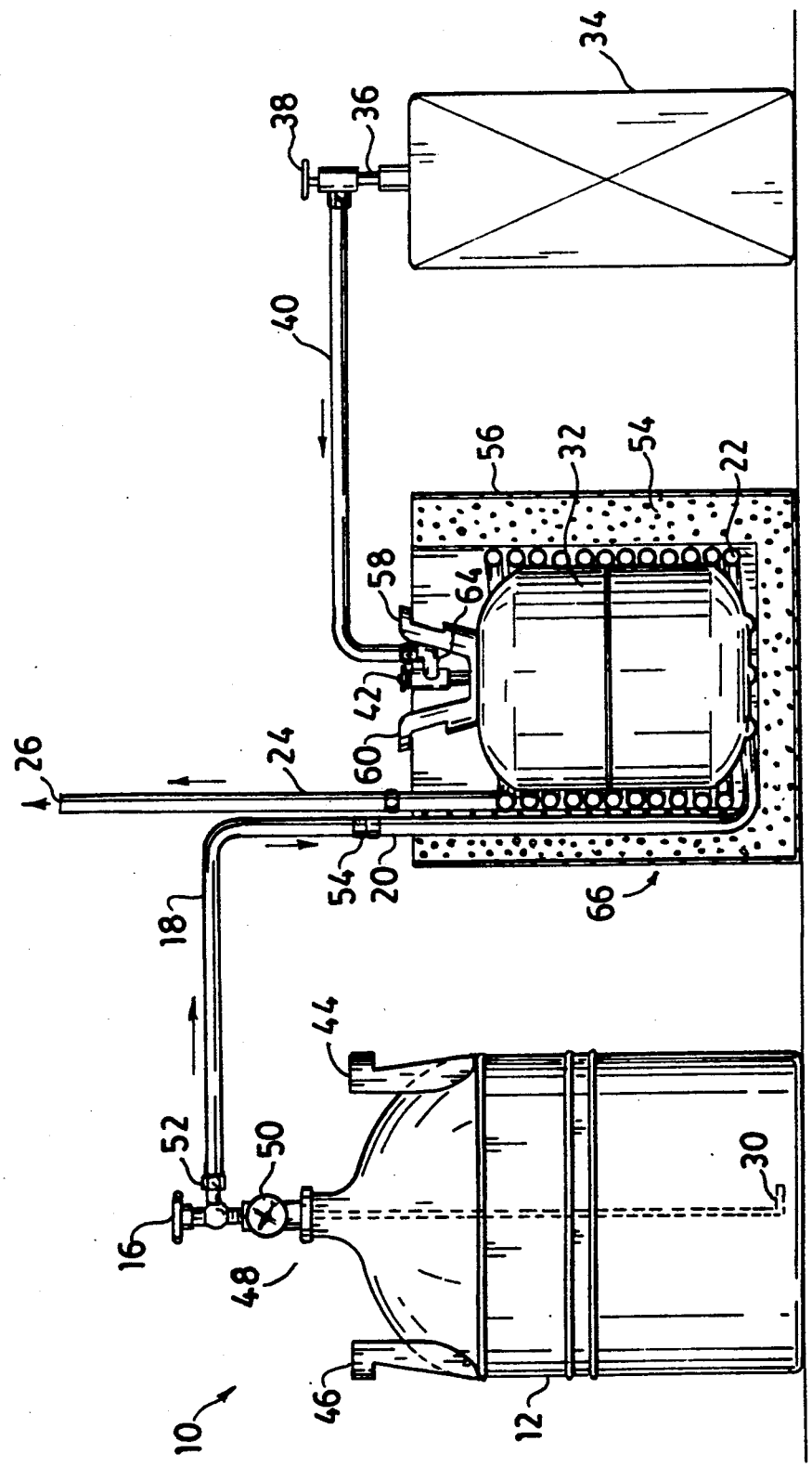
FIG. 2 is a partial sectional view of one preferred embodiment of applicant's invention

FIG. 2 illustrates one specific preferred embodiment of applicant's invention.

Referring to FIG. 2, the source of expandable and expendable refrigerant 10 is comprised of an MVE "Lab Series Container" model "Lab 20" (sold by the Minnesota Valley Engineering Company of 407 Seventh Street, N. W., New Prague, Minn. 56071 as part number 99-1797-9). This bottle has a liquid nitrogen capacity of 21 liters, a static holding time of 116.7 days, a static evaporation rate of 0.18 liters per day, a neck opening of 2.0 inches, a height of 21.7 inches, an internal diameter of 11.4 inches, and an empty weight of 19 pounds.

The "Lab 20" model also comprises handles 44 and 46 which facilitate its carrying When the "Lab 20" container is fully charged with liquid nitrogen, it weights only 56 pounds.

In the embodiment illustrated in FIG. 2, the "Lab 20" container is fitted with a Minnesota Valley Engineering Liquid Discharge Device 48, model number 97-1100-9.

The Liquid Discharge Device 48 is comprised of a rubber stopper (not shown), a pressure gauge 50, a relief valve (not shown), a vent valve (not shown), a discharge valve 16, and a safety cable (not shown).

It will be apparent to those skilled in the art that other means of controlling the flow of the refrigerant from container 12 may be used in place of the hand valve. Thus, by way of illustration and not limitation, one may use an automatic valve with a control feedback circuit.

The rubber stopper (not shown) provides a seal against the walls of the neck tube of the container 12; this rubber stopper is available as MVE part number 47-1006-7. Tightening the wing nut (not shown) in device 48 expands the rubber stopper; the wing nut is available as MVE part number 2912001.

The pressure gauge indicates the pressure within container 12. This pressure gauge is available as MVE part number 2010024.

The relief valve relieves pressure inside the container automatically when excessive pressure is reached. This valve is available as MVE part number 1810112.

The vent valve provides means to vent product; it can be closed to pressurize the vessel or opened to depressurize the vessel. This valve is available as MVE part number 1711042.

The discharge valve allows product to flow out of the vessel through line 18. The discharge valve is available as MVE part number 1711952.

The safety cable prevents the discharge device from accidentally exiting completely from the vessel; it is available as MVE part number 9027109.

Referring again to FIG. 2, container 12 is connected via lines 18 and 20 to coil 22.

Line 18 may be rigid or flexible tubing. In one preferred embodiment, it is braided stainless steel tubing with an internal diameter of 0.25 inches.

Line 18 is connected to valve 16 by 0.375" NTP×0.375" flare fitting 52. Line 18 is also connected to line 20 by a 0.375" flare fitting 54 compatible with line 20.

In the embodiment illustrated in FIG. 2, line 20 and coil 22 and line 24 are integral extensions of each other, each consisting of nominal 0.50 inch soft L-copper tubing. As is illustrated in FIG. 2, this tubing is wound in a substantially spiral pattern so that the distance between adjacent coils does not exceed about 1.0 inch, and the internal diameter of the coils is about 9 inches.

Referring again to FIG. 2, the coil 22 is substantially contiguous with the outside diameter of container 32, thereby maximizing thermal flow between said materials. Thus, in this embodiment, container 32 has an outside diameter of about 9 inches.

In the preferred embodiment illustrated in FIG. 2, coil 22 is surrounded by insulating material 54 which is preferably contained within protective container 56.

Any suitable insulating material 54 may be used. Thus, e.g., one may use fiberglass, mineral wool, closed cell foam, and the like.

Any suitable protective container for protecting the insulating material 54 and the coil 22 may be used as container 56. In one preferred embodiment, said container 56 consists essentially of polyurethane sheet formed into a cylinder. This container 56 preferably has a braced bottom (not shown).

Container 32 may be any container which is suitable for receiving refrigerant. In the embodiment illustrated in FIG. 2, container 32 is comprised of handles 58 and 60, valve 42, and discharge port 64. The discharge port 64 is connected to refrigeration hose 40.

By way of illustration, container 32 may be a "DISPOS-A-CAN" container (available from the E. I. DuPont de Nemours and Company of Wilmington, Del.). This container meets military specification M1025.

Refrigeration hose 40 is connected to valve 38, which in turn is connected to line 36. Line 36 may be connected by conventional means to a source of the contaminated refrigerant to be removed. Thus, as will be apparent to those skilled in the art, line 36 may be connected by soldering, flaring, or brazing it to the source of the contaminated refrigerant.

When valve 38 is a standard refrigeration access valve, it will not be necessary to utilize line 36.

In the operation of the process of this invention, a container 12 charged with liquid nitrogen, and a nitrogen evaporator assembly 66, are carried to the site where one wishes to recover the refrigerant.

When one has arrived at the site of the contaminated refrigerant, container 12 and nitrogen evaporator system 66 are connected to each other as illustrated in FIG. 2, by line 18. Refrigerant container 32 is then disposed so that it is contiguous with coil 22. Thereafter, refrigeration line 40 is connected between container 32 and valve 38.

Thereafter, valves 42 and 38 are opened so that the gas pressures within containers 32 and 34 become substantially equalized. Thereafter, valve 16 is opened to allow the flow of liquid nitrogen to coil 22. The rate of flow of such liquid should be adjusted so that vapor is seen exiting at point 26.

DESCRIPTION OF ANOTHER PREFERRED EMBODIMENT

Figure 4:
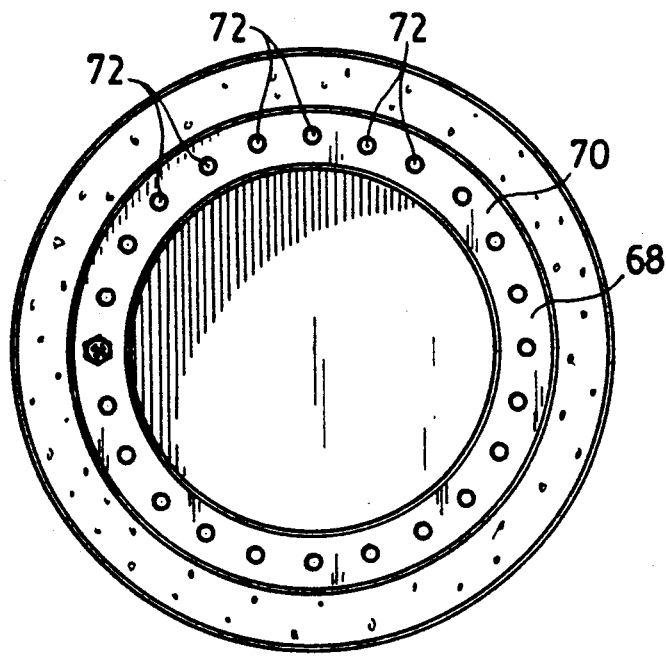
FIG. 4 is a top view of the evaporator of FIG. 3.
Figure 3:
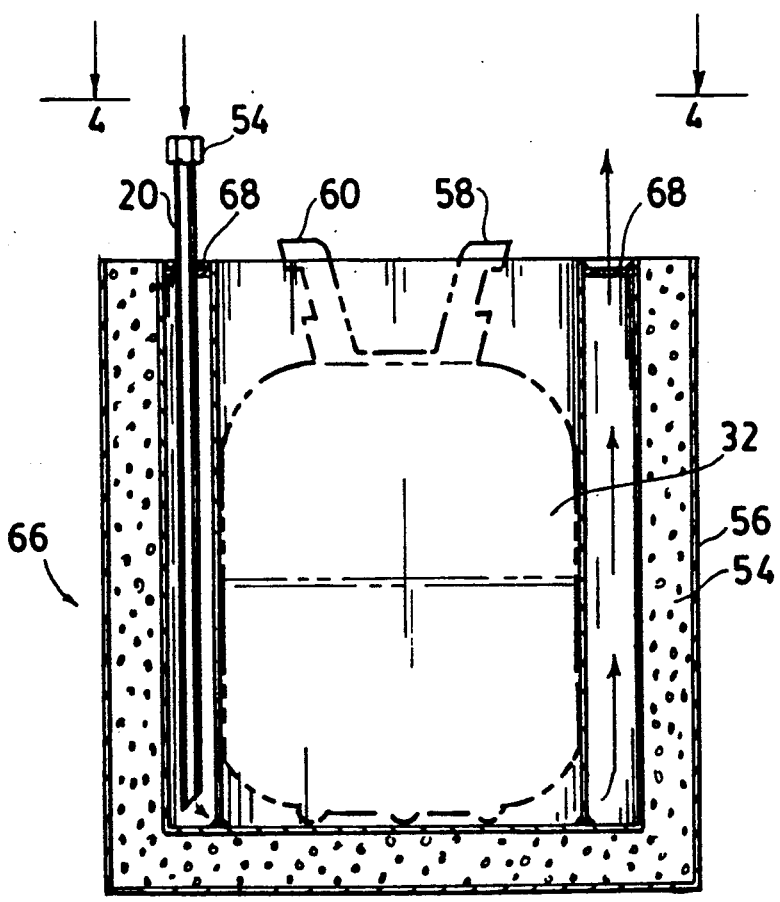
FIG. 3 is a sectional view of one embodiment of an evaporator which may be used in the apparatus of the applicant's invention.

Another preferred embodiment of the invention is shown in FIGS. 3 and 4. Referring to FIGS. 3 and 4, it will be noted that a different configuration for coil 22 is illustrated. The coil 22 is replaced by a shell-type evaporator 68. This shell type evaporator, which is contiguous with and surrounds container 32, is adapted to vent at its top 70 through orifices 72 around its circumference. These shell-type evaporators are well known to those skilled in the art and are illustrated, e.g., on page 101 of said "Modern Refrigeration and Air Conditioning" text.

The apparatus of this invention may be used to recover any of the known chlorofluorocarbon and/or halon refrigerants currently in use. Many of these materials contain from about 1 to about 5 carbon atoms and at least about two halogen atoms selected form the group consisting of chlorine, fluorine, bromine, and iodine atoms and mixtures thereof. Thus, by way of illustration, one may recover trichlorofluoromethane, dichlorodifluoromethane, 1,2-trichloro-1,2,2-trifluoroethane, 1,2-dichloro-1,1,2,2-tetrafluoroethane, 1-chloro-1,1,2,2,2-pentafluoroethane, bromochlorodifluoromethane, bromotrifluoromethane, 1,2-dibromo-1,1,2,2-tetrafluoroethane, an azeotropic mixture of 74 weight percent of dichlorodifluoromethane and difluoroethane, an azeotropic mixture of 49 weight percent of chlorodifluoromethane and 1-chloro-1,1,2,2,2-pentafluoroethane, bromochloromethane, chlorodifluoroethane, 2,2-dichloro-1,1,1-trifluoroethane, 2-chloro-1,1,1,2-tetrafluoroethane, pentafluoroethane, 1,1,1,2-tetrafluoroethane, 1,1-dichloro-1-fluoroethane, 1-chloro-1,1-difluoroethane, 1,1,1-tetrafluoroethane, 1,1-difluoroethane, and the like.

Although applicant has very specifically described many aspects of his invention, many other modifications will suggest themselves to those skilled in the art upon a reading of the disclosure. These are intended to be comprehended within the scope of this invention.

Thus, other refrigeration devices which contain similar elements and are both lightweight and portable also are comprehended within the scope of this invention. In general, as long as container 12 has an internal volume of about 20 liters or less, the device generally will be suitably lightweight.

Thus, although applicant has shown a preferred embodiment wherein the expendable refrigerant vents to atmosphere, it will be apparent to those skilled in the art that one may vent said refrigerant to any area of lower pressure such as, e.g., a container at lower pressure than container 12. In general, the pressure within container 12 will be less than 12.5 p.s.i.g.

Thus, although in applicant's preferred embodiment at least a portion of the conduit leading from container 12 is contiguous with the container 32, one may construct an embodiment in which at least a portion of such conduit is contiguous with an intermediate heat transfer medium which, in turn, is contiguous with the container 32.

I claim:

1. A lightweight, portable unmotorized apparatus for removing a condensable gas from a vessel comprised of said gas, wherein said apparatus is comprised of:
(a) a first container adapted to contain a refrigerant, conduit means partially disposed within said first container for allowing at least a portion of said refrigerant to flow from said first container and to vent to an area of lower pressure than that present in said first container, pressure relief means connected to said first container for allowing said refrigerant in said first container to vent to atmosphere whenever the pressure in said first container exceeds a specified level, a first valve means for controlling the flow of said refrigerant from said first container; (b) a second container adapted to receive gas, and second valve means for controlling the flow of said gas into said second container; wherein: the internal volume of said first container does not exceed about 20 liters; said first container is a substantially cryogenic container; and at least a portion of said conduit means is contiguous with at least a portion of said second container, whereby, when said condensable gas is vented, said second container is cooled.

2. The apparatus as recited in claim 1, wherein said first container is cylindrical.

3. The apparatus as recited in claim 2, wherein at least a portion of said conduit means is in the form of a coil.

4. The apparatus as recited in claim 3, wherein at least a portion of said coil is contiguous with said second container.

5. The apparatus as recited in claim 4, wherein said first container is comprised of aluminum.

6. The apparatus as recited in claim 5, wherein said second container is comprised of steel.

7. The apparatus as recited in claim 6, wherein said conduit has a substantially circular cross-sectional shape.

* * * * *